United States Patent [19]
Johnson

[11] 4,077,151
[45] Mar. 7, 1978

[54] NON-SNAGGING SINKER

[76] Inventor: Lloyd M. Johnson, 15521 Dalmation Ave., La Mirada, Calif. 90638

[21] Appl. No.: 742,985

[22] Filed: Nov. 18, 1976

[51] Int. Cl.² .............................................. A01K 95/00
[52] U.S. Cl. .................. 43/43.12; 43/44.97; 206/390
[58] Field of Search ................. 43/44.97, 44.99, 43.12; 206/390

[56] References Cited
U.S. PATENT DOCUMENTS

| 2,308,238 | 1/1943 | Baker | 43/43.12 |
| 2,780,021 | 2/1957 | Fagg | 43/44.99 X |
| 3,283,422 | 11/1966 | Nygard | 206/390 X |
| 3,481,461 | 12/1969 | Paxton | 206/390 X |

FOREIGN PATENT DOCUMENTS 2,275,145  1/1976  France .......................... 43/43.12

Primary Examiner—Louis G. Mancene
Assistant Examiner—Daniel J. Leach
Attorney, Agent, or Firm—Francis X. Lo Jacono, Sr.

[57] ABSTRACT

A non-snagging fishing sinker comprising a flexible plastic bag having at least three sides defined thereby, wherein one side is open to allow various weight-providing materials to be placed therein, preferably wet sand. Disposed along and adjacent to the open side are a plurality of holes to receive a wrapping wire which is provided with an eye hook to be attached to a conventional fishing line. There is also formed adjacent and below the holes a weakened area, whereby the lower portion of the bag can be easily separated from the fishing line when the sinker is snagged; that is, the bag is allowed to tear along the weakened area.

8 Claims, 7 Drawing Figures

U.S. Patent   March 7, 1978   4,077,151
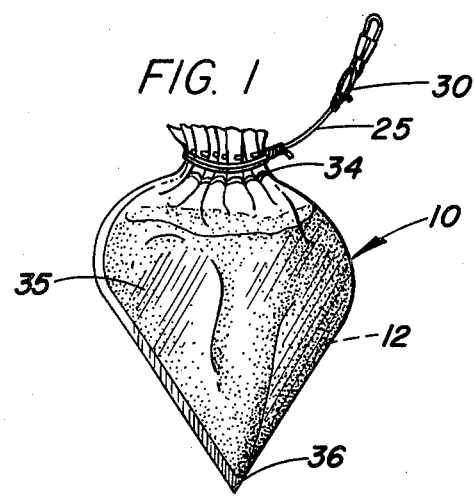
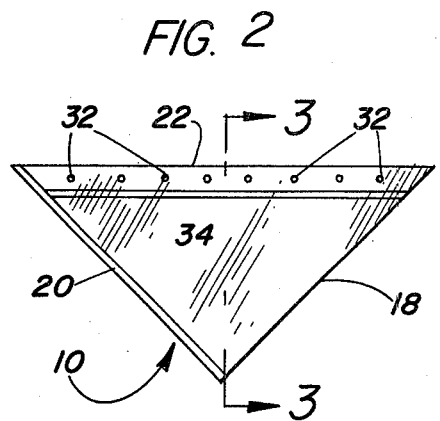
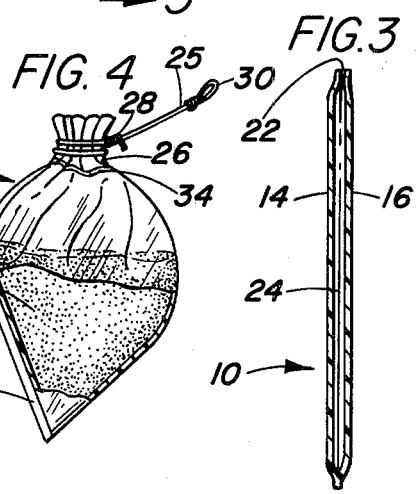
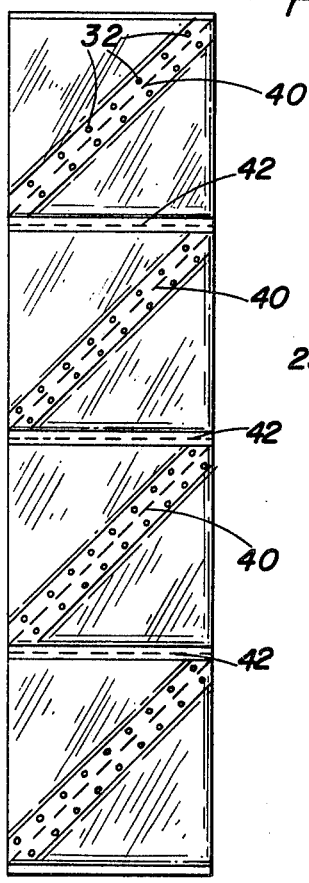
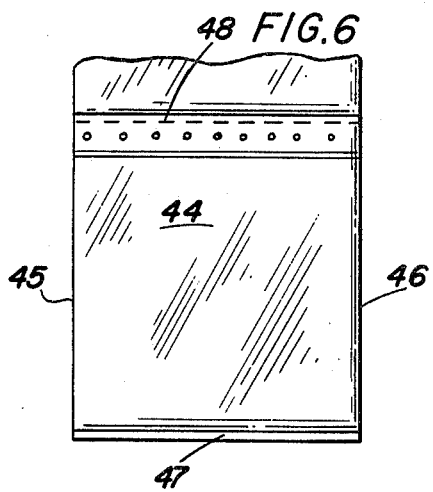

NON-SNAGGING SINKER

BACKGROUND OF THE INVENTION

1. Field of the Invention

This invention relates to fishing sinkers for attachment to the well known fishing line and, more particularly, to a non-snagging sinker, wherein the sinker is readily separated from the line when snagged.

2. Description of the Prior Art

As is well known in the art, various problems and difficulties are encountered in providing a suitable sinker device for fishermen, whereby the device does not become snagged when the sinker is later retrieved.

Several types of fishing sinkers are used which generally comprise a mass of heavy metal, such as lead, which is attached directly to the fishing line. These sinkers are provided in a variety of shapes, all of which are readily capable of being caught or snagged along the bottom of a body of water, particularly wherein rocky bottom surfaces or other types of obstructions prevail. The sinker may be caught on or between objects such as rocks or vegetation as it is being retrieved—particularly when fishing from a breakwater constructed of rocks. As a fisherman well knows, his chances of snagging and losing a sinker are high at all times, even if the line is cast so that the sinker falls in an area free of obstructions. These conditions result in the loss of expensive fishing equipment, as well as loss of time in trying to disengage the sinker from its captured location.

Examples of different types of sinkers and their structures are disclosed in several United States patents. The patent to Sells (U.S. Pat. No. 3,672,088) relates to a fishing sinker having a fixed weight disposed in an elongated plastic tube, the weight being positioned at the trailing end; and the upper part of the capsule is filled with air to make it buoyant. Thus, the sinker is designed to be maintained in an upright position at all times.

United States Patent to Newell (U.S. Pat. No. 3,648,398) discloses a releasable sinker having a tubular holder wherein a cylindrical weight is attached. However, when this sinker is caught or snagged, the expensive weight is lost—defeating one of the principal objects of the present invention, which is to prevent the loss of costly metals.

Other patents of interest are U.S. Pat. Nos. 3,670,447 and 3,466,788 which also disclose buoyant chambers to allow the sinkers to remain in a substantially vertical position on the bottom of the body of water. None of the above references discloses or provides a device wherein the entire unit is allowed to be separated from the line by use of a simple plastic bag.

SUMMARY OF THE INVENTION

The present invention discloses a non-snagging fishing sinker comprising a flexible-plastic, bag-like container having at least three closed sides and one open end to allow various materials to be disposed in the bag compartment. Of the various weighting materials to be used with the bag, it has been found that wet sand provides an efficient, and economical product to be used therewith since one object is to allow the bag to be torn when snagged.

The preferable form of the bag is defined by two thin sheets of plastic having a generally triangular shape; however, various other configurations can also be employed.

The triangular configuration includes two sides which are closed and one side which is open, the open side forming the top; thereby, the bottom or opposite portion thereof comes to a peak, forming a trailing point.

Disposed adjacent each open edge of each sheet are a plurality of apertures wherein a closing means is threaded, such as a plastic-covered wire having an eye hook formed on one free end thereof.

The bag is filled with material; and the top is held closed by the wire to which a fishing sinker is attached in the normal suitable manner well known in the art.

In addition, a weakened area in the form of an elongated strip is provided just below the apertures. This provides a means whereby the bag can readily tear when caught, thereby freeing the line without damage to the fishing gear or the loss of any costly sinkers.

OBJECTS AND ADVANTAGES OF THE INVENTION

The present invention has for an important object the provision for a fishing sinker which comprises a plastic bag that can be filled with wet sand or other like materials, and is easily closed by a wire having an eye hook to connect to a fishing line.

It is another object of the invention to provide a non-snagging fishing sinker that is allowed to tear and separate from the fishing line.

It is still another object of the invention to provide a fishing sinker of this type wherein the bag configuration is substantially that of a triangle, the apex thereof forming the trailing edge when positioned on the bottom surface under the water, whereby the waves tend to wash over the pointed end without exerting much force so that the sinker is carried toward shore; and wherein the larger end thereof has a greater area to be caught by the undertow which carries the sinker out and keeps tension on the line.

It is still another object of the invention to provide a sinker of this character that includes perforated holes, whereby wire or leader-type material can be threaded therethrough and provide a means for closing the bag—the holes, in addition, allowing water to enter the bag and fill any air pockets.

It is a further object of the invention to provide a weakened area adjacent the end to be tied whereby the bag can be torn off when it becomes unretrievable on an obstruction.

It is a still further object of the invention to provide a sinker of this character wherein the perforated holes will become elongated when pulled by the threaded wire, causing the area around the holes to stretch, due to the plasticity of the bag which becomes elongated beneath the wire when the force of the casting motion is applied, thus preventing the line from snapping.

Still another object of the invention is to provide a device of this character that is relatively inexpensive to use and manufacture.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a side-elevational view of the present invention, showing the plastic bag filled with a weight material and secured by a wire-connecting lead;

FIG. 2 is a side-elevational view of the sinker prior to being filled;

FIG. 3 is an enlarged cross-sectional view thereof, taken along line 3—3 of FIG. 2;

FIG. 4 is another side-elevational view of the device having a portion thereof broken away;

FIG. 5 is an elevational view of one arrangement in which the bags are formed as a continuous sheet;

FIG. 6 is an alternative arrangement, showing the bag in a substantially rectangular configuration; and FIG. 7 is an elevational view of the wire-connecting lead.

DESCRIPTION OF THE PREFERRED EMBODIMENT

Referring more particularly to the accompanying drawings, there is shown in FIG. 1 a non-snagging fishing sinker, generally indicated at 10, having a weighty material 12 disposed therein, the material being generally comprised of a load of wet sand, gravel, or a combination of such materials.

The fishing sinker comprises a plastic bag arrangement having at least two sides 14 and 16 formed from sheets of plastic. Accordingly, the preferred configuration of said bag is shown in FIG. 2 as being in a triangular shape having two closed or sealed edges 18 and 20, and an open receiving end 22.

When a sinker is to be used, a "load" of wet sand of a suitable or prescribed weight, in keeping with the particular type of fishing being carried out at a given time, is placed in compartment 24 as defined by side sheets 14 and 16. At this point, the open end 22 of the bag is gathered together, as seen in FIG. 4; and then a wire-securing means 25 is wrapped about the neck portion 26 of the bag, the neck portion 26 being formed when the end is gathered and closed.

The wire as seen in FIG. 4 is wrapped around the neck several times and then twisted, as at 28, thereby closing the bag and providing a connecting lead having an end hook 30. It is contemplated that the wire will be coated with a protective layer of plastic so as to prevent rust thereon.

Further, however, each opposing plastic sheet 14 and 16 will be provided with additional means to secure the wire member to the bag, the additional means being in the form of a plurality of holes 32 formed along and adjacent to the open edge 22. Thus, as seen in FIG. 1, the wire lead 25 is threaded through the holes and then secured in a twisting arrangement.

When wire 25 is threaded in this manner, the wet sand is kept in compartment 24 and will allow water to readily enter said compartment to fill any voids or air pockets that might be formed therein. The holes also serve a second purpose in that the bag will become elongated when pulled by the threaded wire, thereby causing the area around the holes to stretch. Thus, due to the plasticity of the bag, it will readily stretch and elongate beneath the wire when the force of the casting motion is applied. This will help to prevent the fishing line from snapping due to its shock-absorbing capabilities.

Accordingly, after the wire is threaded as seen in FIG. 1, it can be attached to the fishing line in any well-known, suitable manner.

Also formed longitudinally under holes 32 is a separating means in the form of a weakened area 34. Each sheet surface 14 and 16 includes an elongated strip that is weakened so as to readily tear or separate the greater portion of the bag, that is, the portion having the weighty material therein.

The sinker, once closed with sand therein, will take a substantially conical shape, as seen in both FIGS. 1 and 4, whereby the enlarged portion 35 of the bag is adjacent the wire lead and the trailing area is formed by the triangular apex 36. When the sinker rests on the water bottom, apex 36 will be pointed outwardly, facing the oncoming waves which will wash over the pointed end without much force in order to carry the sinker toward shore; whereas the enlarged portion 35 is caught by the undertow and is forced outwardly, keeping tension on the line.

However, if the sinker becomes snagged on an object, one merely pulls hard on the line and the bag will tear along the weakened strip 34, thereby releasing the weight material from the line, thus freeing the line.

Various methods for manufacturing of the bags are contemplated and one arrangement is herein shown in FIG. 5, wherein the bags are formed in a continuous manner, having an angular tear line 40 and lateral tear line 42. Thus, each square-shaped configuration provides two triangular sinker bags.

However, as a further alternative arrangement each bag can take the shape of a square bag 44, as seen in FIG. 6, wherein it includes closed or sealed edges 45, 46 and 47, with a tear line 48 which, when separated, provides the open edge for each bag.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore descibed being merely by way of example, and I do not wish to be restricted to the specific form shown or uses mentioned, except as defined in the accompanying claims.

I claim:

1. A non-snagging fishing sinker device arranged to receive and store various weighty materials therein, said device comprising:

a flexible plastic bag having at least two side walls wherein one edge formed thereby is open to receive said weighty material therein;

said walls having a plurality of spaced apertures formed adjacent the open edge of said bag; and wherein said walls include a weakened area in the form of a longitudinal strip formed within each side wall below said apertures and in parallel relation thereto, whereby said bag formed by said walls can be torn and separated from the fishing line to which it would be attached.

a storage compartment defined by said side walls; and means for securing and closing said opening of said opening of said bag, said means being affixed about said open edge.

2. A sinker device as recited in claim 1, wherein said securing and closing means comprises a strand of wire having a protective covering disposed thereon and having one end thereof provided with an eye hook for attachment to the fishing line, the opposite end thereof being free.

3. A sinker device as recited in claim 2, wherein said strand of wire is threaded through said apertures, allowing said open edge to be gathered together and closed thereby, wherein the free end of said wire is twisted about the extending portion of said wire.

4. A sinker device as recited in claim 3, wherein said bag comprises a triangular configuration wherein two leading edges thereof are sealed and converge to provide a closed apex and wherein the third edge thereof is open to receive said weighty material.

5. A sinker device as recited in claim 4, wherein said sinker, when filled with said weighty material, provides a configuration wherein the area adjacent the forward end becomes enlarged and the apex portion thereof forms a trailing edge of said sinker.

6. A sinker device as recited in claim 5, wherein said weighty material comprises wet sand, and wherein water is allowed to seep into said compartment through said apertures and the gathered, secured end thereof.

7. A sinker device as recited in claim 1, wherein a plurality of bags are formed in a continuous single sheet of plastic having tear lines, wherein said bags can be individually disconnected from said single sheet.

8. A sinker device as recited in claim 7, wherein two tear lines are included therein, a first tear line being angularly disposed to a second tear line, and wherein a pair of triangular bags are arranged in a given rectangular area.

* * * * *